United States Patent
Nakajima et al.

(10) Patent No.: US 11,999,144 B2
(45) Date of Patent: Jun. 4, 2024

(54) DECORATIVE SHEET AND DECORATIVE PANEL

(71) Applicant: Dai Nippon Printing Co., Ltd., Tokyo (JP)

(72) Inventors: Tomomi Nakajima, Tokyo (JP); Jun Kaneki, Tokyo (JP); Hiroki Kawanishi, Tokyo (JP); Ryo Fujii, Tokyo (JP); Osamu Watanabe, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 139 days.

(21) Appl. No.: 16/487,495

(22) PCT Filed: Feb. 28, 2018

(86) PCT No.: PCT/JP2018/007437
§ 371 (c)(1),
(2) Date: Aug. 21, 2019

(87) PCT Pub. No.: WO2018/159660
PCT Pub. Date: Sep. 7, 2018

(65) Prior Publication Data
US 2020/0055295 A1 Feb. 20, 2020

(30) Foreign Application Priority Data

Feb. 28, 2017 (JP) ................. 2017-037391

(51) Int. Cl.
*B32B 27/32* (2006.01)
(52) U.S. Cl.
CPC .......... *B32B 27/32* (2013.01); *B32B 2264/10* (2013.01); *B32B 2451/00* (2013.01)
(58) Field of Classification Search
None
See application file for complete search history.

(56) References Cited

U.S. PATENT DOCUMENTS

| | | | |
|---|---|---|---|
| 2002/0198326 A1 | 12/2002 | Aoyama et al. | |
| 2007/0282034 A1 | 12/2007 | Patel et al. | |
| 2016/0211490 A1 | 7/2016 | Hashimoto et al. | |
| 2016/0325535 A1 | 11/2016 | Ueno et al. | |
| 2017/0022388 A1* | 1/2017 | Zhang | B29B 13/04 |
| 2018/0186132 A1 | 7/2018 | Ikeda et al. | |
| 2019/0202192 A1* | 7/2019 | Sekino | B32B 7/12 |

FOREIGN PATENT DOCUMENTS

| | | | |
|---|---|---|---|
| CN | 1938477 A | 3/2007 | |
| CN | 101045349 A | 10/2007 | |
| CN | 101045350 A | 10/2007 | |
| CN | 105992694 A | 10/2016 | |
| EP | 3124240 A1 | 2/2017 | |
| JP | H07-242773 A | 9/1995 | |
| JP | 2005-074683 A | 3/2005 | |
| JP | 2006123512 A * | 5/2006 | |
| JP | 5954048 B2 * | 7/2016 | |
| JP | 2016-168830 A | 9/2016 | |
| JP | 2017 024202 A | 2/2017 | |
| KR | 10-2006-0044600 A | 5/2006 | |
| WO | WO-2006044376 A1 * | 4/2006 | ............... C09D 7/62 |
| WO | 2015-041281 A1 | 3/2015 | |

OTHER PUBLICATIONS

Matsukawa et al., JP2006123512A, May 18, 2006 (Year: 2006).*
Kawasaki et al., JP 2014040055, Mar. 6, 2014 (machine translation) (Year: 2014).*
Office Action dated Jan. 6, 2021, issued for the corresponding Chinese patent application No. 201880014480.3.
International Search Report dated May 29, 2018, issued for PCT/JP2018/007437.
Supplemental Extended European Search Report dated Oct. 8, 2020, for the corresponding European patent application No. 18761361.7.
New Supplemental Extended European Search Report dated Nov. 2, 2020, for the corresponding European patent application No. 18761361.7.
Office Action dated Dec. 10, 2021, for the corresponding Korean patent application No. 10-2019-7025152 with translation.
Office Action dated Nov. 24, 2021, for the corresponding Japanese patent application No. 2019-503050 with translation.

* cited by examiner

*Primary Examiner* — Cheng Yuan Huang
(74) *Attorney, Agent, or Firm* — Locke Lord LLP; James E. Armstrong, IV; Nicholas J. DiCeglie, Jr.

(57) ABSTRACT

The present invention provides a decorative sheet that exhibits excellent scratch resistance under high-load conditions and excellent bending workability; and provides a decorative plate containing the decorative sheet. Specifically, the present invention provides a decorative sheet that contains, in sequence, a first olefin resin layer, a second olefin resin layer, and a surface-protecting layer, wherein indentation hardness $H_{IT}^2$ of the second olefin resin layer and indentation hardness $H_{IT}^1$ of the surface-protecting layer satisfy the following formulas (1) and (2): $H_{IT}^2 \geq 100$ MPa (1), and $H_{IT}^1 > H_{IT}^2$ (2). The invention also provides a decorative plate containing the decorative sheet.

6 Claims, 2 Drawing Sheets

115°

(a)

(b)

(c)

DECORATIVE SHEET AND DECORATIVE PANEL

TECHNICAL FIELD

The present invention relates to decorative sheets and decorative plates.

BACKGROUND ART

A surface-protecting layer is known to be formed from a cured coating film of an ionizing radiation-curable resin on decorative sheets used in, for example, surface materials of building materials, in order to increase the scratch resistance of the sheets. However, among such decorative sheets, even decorative sheets for floors, which are supposed to be excellent in scratch resistance, are not completely resistant to scratches. Such decorative sheets become scratched in scratch tests under high-load conditions (PTL 1).

To use decorative sheets in floors in a variety of situations, for example, not only in the floors of residential buildings, but also in the floors of non-residential buildings (e.g., stores), further improvement is needed in scratch resistance of the surface-protecting layer of decorative sheets.

To further improve the scratch resistance of decorative sheets under high-load conditions, hardening the surface-protecting layer is suggested. However, an overly hard surface-protecting layer may result in cracks and fractures on the surface-protecting layer when the decorative sheet is subjected to a bending process, such as V-grooving or wrapping. Thus, it is not necessarily easy to achieve both bending processing suitability and hardness for scratch resistance in decorative sheets.

CITATION LIST

Patent Literature

PTL 1: JP2005-74683A

SUMMARY OF INVENTION

Technical Problem

An object of the present invention is to provide a decorative sheet that exhibits excellent scratch resistance under high-load conditions, and excellent bending workability; and a decorative plate that contains the decorative sheet.

Solution to Problem

The present inventors conducted extensive research to achieve the object, and found that the following decorative sheets and decorative plate solve the problem of the present invention.

1. A decorative sheet comprising, in sequence, a first olefin resin layer, a second olefin resin layer, and a surface-protecting layer,
   wherein indentation hardness $H_{IT}^2$ of the second olefin resin layer and indentation hardness $H_{IT}^1$ of the surface-protecting layer satisfy the following formulas (1) and (2):

$$H_{IT}^2 \geq 100 \text{ MPa} \qquad (1); \text{ and}$$

$$H_{IT}^1 > H_{IT}^2 \qquad (2).$$

2. The decorative sheet according to Item 1, wherein the indentation hardness $H_{IT}^1$ of the surface-protecting layer satisfies the following formula (3):

$$450 \text{ MPa} > H_{IT}^1 \qquad (3).$$

3. The decorative sheet according to Item 1 or 2, wherein the indentation hardness $H_{IT}^2$ of the second olefin resin layer and indentation hardness $H_{IT}^3$ of the first olefin resin layer satisfy the following formula (4):

$$H_{IT}^2 > H_{IT}^3 \qquad (4).$$

4. The decorative sheet according to any one of Items 1 to 3, wherein the second olefin resin layer is a microcrystalline olefin resin layer.

5. The decorative sheet according to any one of Items 1 to 4, wherein the surface-protecting layer comprises inorganic microparticles with a mean particle size of 20 μm or less.

6. A decorative plate comprising a laminate, the laminate comprising, in sequence in the thickness direction,
   a decorative plate base, and
   the decorative sheet according to any one of Items 1 to 5.

Advantageous Effects of Invention

The present invention provides a decorative sheet that exhibits excellent scratch resistance under high-load conditions and excellent bending workability; and a decorative plate that contains the decorative sheet.

DESCRIPTION OF EMBODIMENTS

1. Decorative Sheet

The following describes the decorative sheet and decorative plate according to the present invention in detail.

Figure 1:
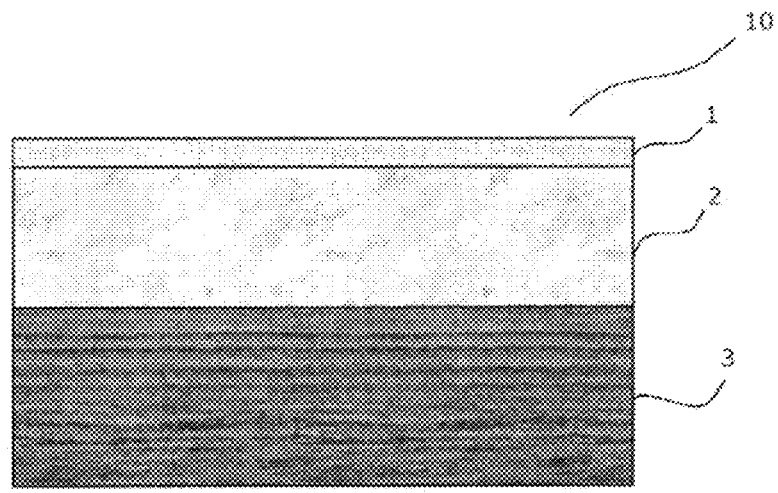
FIG. 1 is a cross-sectional diagram of the decorative sheet according to an embodiment of the present invention.
Figure 2:
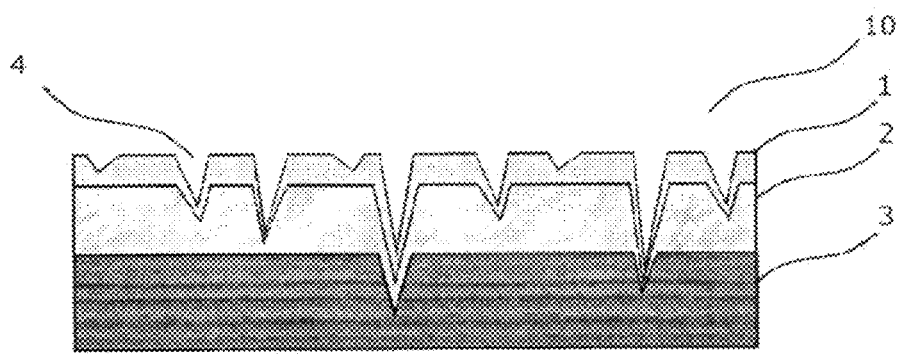
FIG. 2 is a cross-sectional diagram of the decorative sheet according to another embodiment of the present invention.

FIG. 1 is a cross-sectional diagram of the decorative sheet according to an embodiment of the present invention, illustrating a decorative sheet 10 that contains, in sequence in the thickness direction, a first olefin resin layer 3, a second olefin resin layer 2, and a surface-protecting layer 1. FIG. 2 illustrates embossed depressions 4 formed at least from the surface-protecting layer side. The following explanation sometimes refers to the drawings.

In this specification, for example, in FIG. 1, the direction in which the surface-protecting layer 1 is laminated, as viewed from the second olefin resin layer 2, is referred to as "above" or "front face"; and the direction in which the first olefin resin layer 3 is laminated, as viewed from the second olefin resin layer 2, is referred to as "below" or "reverse face." The "face of the front (side)" of the decorative sheet or decorative plate or the "face of the surface-protecting layer (side)" refers to the face that can be viewed after the decorative sheet or decorative plate has been formed.

In this specification, the numerical range indicated by "X to Y" refers to "X or more," and "Y or less." For example, "α to β mm" indicates α mm or more, and β mm or less.

Decorative Sheet

The decorative sheet 10 according to the present invention, as illustrated in FIG. 1, contains, in sequence, a first olefin resin layer 3, a second olefin resin layer 2, and a surface-protecting layer 1, wherein indentation hardness $H_{IT}^2$ of the second olefin resin layer 2 and indentation hardness $H_{IT}^1$ of the surface-protecting layer 1 satisfy the following formulas (1) and (2):

$$H_{IT}^2 \geq 100 \text{ MPa} \quad (1); \text{ and}$$

$$H_{IT}^1 > H_{IT}^2 \quad (2).$$

Indentation Hardness

In this specification, the "indentation hardness" of each layer is indicated by nanoindentation hardness measured with a TribolIndenter (registered trademark) TI-950 tester for surface film physical properties (Hysitron).

The method for measuring the indentation hardness ($H_{IT}$) of each layer with the TribolIndenter (registered trademark) TI-950 is as described below.

Figure 4:
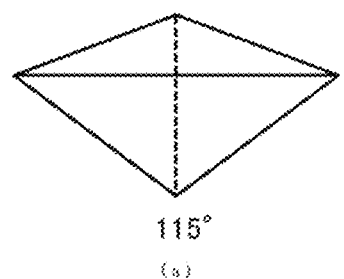
FIG. 4 illustrates a method for measuring indentation hardness in this specification.
Figure 4:
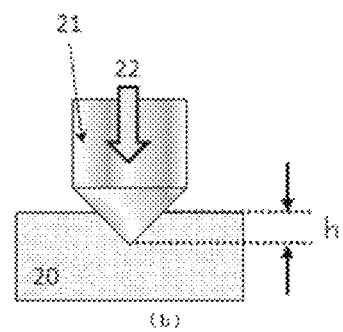
Figure 4:
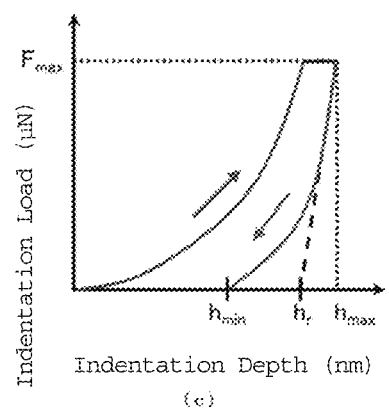

(1) A Berkovich indenter, illustrated in FIG. 4(a), is pushed into a measurement sample as shown in FIG. 4(b) under the indentation conditions described below, and "a projected contact area (Ap) (mm$^2$) corrected in accordance with the instrument standard" is calculated from the geometrical shape of triangular pyramid impression formed on the surface. The maximum test load ($F_{max}$) is divided by the value Ap to determine the hardness.

Specifically, $H_{IT} = F_{max}/Ap$.

(2) The indentation conditions are as follows: first, as illustrated in FIG. 4(c), a load of 0 to 50 µN is applied to the first olefin resin layer and then the second olefin resin layer over 5 seconds (i.e., 10 µN/s) at room temperature (laboratory environment temperature). Second, the layers are maintained with application of a load of 50 µN ($F_{max}$) for 5 seconds. Finally, unloading from 50 to 0 µN is performed over 10 seconds. The surface-protecting layer is, first, subjected to application of a load of 0 to 100 µN over 10 seconds (i.e., 10 µN/s). Second, the surface-protecting layer is maintained with a load of 100 µN ($F_{max}$) for 5 seconds. Finally, unloading from 100 to 0 µN is performed over 10 seconds. Because indentation depth (h) is typically about 100 to 150 nm, the thickness in the indentation direction of the layer that serves as a measurement sample may be 1.0 µm or more (preferably 1.5 µm or more).

Ap is calculated from $24.50[h_{max}-\varepsilon(h_{max}-h_r)]^2$ (E indicates a correction factor due to the geometric shape of the indenter, and $h_r$ indicates the depth of the geometrical shape of triangular pyramid impression remaining on the surface after unloading).

(3) In measuring the hardness, to avoid the impact from the hardness of layers other than the layer that serves as a measurement sample, the hardness of the cross-sectional surface of the layer of measurement target is measured. Specifically, a decorative sheet is embedded in a resin (cold curing-type, two-component epoxy curable resin), and left to stand at room temperature for at least 24 hours to be cured. The cured, embedded sample is subjected to mechanical polishing to expose the cross-sectional surface of the layer of measurement target. The Berkovich indenter is impressed into the cross-sectional surface of the layer of measurement target (at the position at which microparticles are not present if microparticles, such as of filler, are contained in the layer) to measure the hardness of the cross-sectional surface of each layer.

(4) To avoid bias, an indentation hardness of 10 points is measured in each layer. The average of the 10 points in each layer is referred to as follows: "indentation hardness $H_{IT}^1$ of the surface-protecting layer," "indentation hardness $H_{IT}^2$ of the second olefin resin layer," and "indentation hardness $H_{IT}^3$ of the first olefin resin layer."

The present invention requires that indentation hardness $H_{IT}^2$ of the second olefin resin layer and indentation hardness $H_{IT}^1$ of the surface-protecting layer satisfy the following formulas (1) and (2). An indentation hardness of the second olefin resin layer and an indentation hardness of the surface-protecting layer that fail to satisfy the following formulas (1) and (2) may result in a failure to achieve excellent scratch resistance under high-load conditions and bending workability.

$$H_{IT}^2 \geq 100 \text{ MPa} \quad (1); \text{ and}$$

$$H_{IT}^1 > H_{IT}^2 \quad (2).$$

Indentation hardness $H_{IT}^1$ of the surface-protecting layer must be higher than indentation hardness $H_{IT}^2$ of the second olefin resin layer for providing scratch resistance under relatively high load, and must exceed 100 MPa.

Additionally, from the standpoint of achieving excellent scratch resistance and excellent bending workability, indentation hardness $H_{IT}^1$ of the surface-protecting layer preferably satisfies the following formula (3):

$$450 \text{ MPa} > H_{IT}^1 \quad (3).$$

From the standpoint of achieving excellent scratch resistance and excellent bending workability, indentation hardness $H_{IT}^2$ of the second olefin resin layer and indentation hardness $H_{IT}^3$ of the first olefin resin layer preferably satisfy the following formula (4):

$$H_{IT}^2 > H_{IT}^3 \quad (4).$$

First Olefin Resin Layer

The first olefin resin layer is formed from an olefin resin, and examples of the olefin resin include homopolymers of olefins, such as ethylene, propylene, and butene; block copolymers or random copolymers of ethylene-propylene; copolymers of at least one member selected from ethylene and propylene with at least one other olefin, such as butene, pentene, and hexene; and copolymers of at least one member selected from ethylene and propylene with at least one other monomer, such as vinyl acetate and vinyl alcohol. Of these, from the standpoint of achieving excellent scratch resistance and excellent bending workability, polyethylene and polypropylene are preferable, with polyethylene being particularly preferable.

The polyethylene may be a homopolymer of ethylene, or a copolymer of ethylene with another comonomer that is copolymerizable with ethylene (e.g., α-olefins such as propylene, 1-butene, 1-hexene, and 1-octene; vinyl acetate; and vinyl alcohol). Examples of polyethylene resins include high-density polyethylene (HDPE), medium-density polyethylene (DOPE), low-density polyethylene (LDPE), linear low-density polyethylene (LLDPE), very-low-density polyethylene (VLDPE), ultra-high-molecular-weight polyethylene (UHMWPE), and crosslinked polyethylene (PEX). These polyethylenes may be used singly, or in a combination of two or more.

The polypropylene may be a homopolymer of propylene, or a copolymer of propylene with another comonomer that is copolymerizable with propylene (e.g., α-olefins such as ethylene, 1-butene, 1-hexene, and 1-octene; vinyl acetate;

and vinyl alcohol). These polypropylenes may be used singly, or in a combination of two or more.

Indentation hardness $H_{IT}^3$ of the first olefin resin layer and indentation hardness $H_{IT}^2$ of the second olefin resin layer preferably have the relationship expressed by formula (4).

In particular, from the standpoint of achieving excellent scratch resistance and excellent bending workability, indentation hardness $H_{IT}^3$ of the first olefin resin layer is preferably 10 to 80 MPa, more preferably 15 to 70 MPa, still more preferably 20 to 60 MPa, and particularly preferably 30 to 55 MPa. An indentation hardness $H_{IT}^3$ within these numerical ranges enables the decorative sheet to maintain scratch resistance and impact resistance (in particular, dent resistance) well, while reducing or preventing the elongation of the first olefin resin layer due to tension added during printing for providing a print or coating with a printer. An indentation hardness $H_{IT}^3$ within these numerical ranges also makes it easier to reduce or prevent cracks and fractures on the surface-protecting layer during the bending process, maintaining impact resistance (in particular, crack resistance) well.

The indentation hardness can be suitably adjusted, for example, by mixing two or more resins of different hardness, or mixing a resin with an elastomer.

From the standpoint of excellent scratch resistance and bending workability, the first olefin resin layer preferably has a thickness of 30 to 120 µm, more preferably 40 to 110 µm, still more preferably 50 to 100 µm, and particularly preferably 55 to 85 µm.

The thickness of the first olefin resin layer, the second olefin resin layer, and the surface-protecting layer in this specification refers to the average of the measured thickness at 10 points.

Second Olefin Resin Layer

The second olefin resin layer is formed from an olefin resin, and indentation hardness $H_{IT}^2$ of the second olefin resin layer must satisfy formulas (1) and (2).

Examples of the olefin resin that forms the second olefin resin layer are the same as those capable of forming the first olefin resin layer. Of these, from the standpoint of excellent scratch resistance and bending workability, polyethylene and polypropylene are preferable, with polypropylene being particularly preferable.

The polypropylene may be a homopolymer of propylene, or a copolymer of propylene with another comonomer that is copolymerizable with propylene (e.g., α-olefins such as ethylene, 1-butene, 1-hexene, and 1-octene; vinyl acetate; and vinyl alcohol). These polypropylenes may be used singly, or in a combination of two or more. From the standpoint of excellent scratch resistance and bending workability, a homopolymer of propylene (homo-polypropylene) is particularly preferable in the present invention.

Indentation hardness $H_{IT}^2$ of the second olefin resin layer must satisfy the following formulas (1) and (2), and preferably satisfies the following formula (4).

$$H_{IT}^2 \geq 100 \text{ MPa} \quad (1); \text{ and}$$

$$H_{IT}^1 > H_{IT}^2 \quad (2)$$

$$H_{IT}^2 > H_{IT}^3 \quad (4)$$

From the standpoint of the balance of scratch resistance and bending workability, indentation hardness $H_{IT}^2$ of the second olefin resin layer is preferably 100 MPa or more, and 200 MPa or less; more preferably 105 MPa or more, and 150 MPa or less; and still more preferably 110 MPa or more, and 130 MPa or less.

An indentation hardness $H_{IT}^2$ of less than 100 MPa may result in poor scratch resistance and impact resistance (in particular, dent resistance), or elongation of the second olefin resin layer due to tension added during printing for providing a print or coating with a printer. An indentation hardness $H_{IT}^2$ of more than 200 MPa may result in cracks and fractures on the surface-protecting layer during the bending process, or poor impact resistance (in particular, crack resistance).

Indentation hardness $H_{IT}^2$ can be easily adjusted, for example, by mixing two or more resins of different hardness, mixing a resin with an elastomer, or forming the second olefin resin layer into a microcrystalline olefin resin layer.

A microcrystalline olefin resin layer can be obtained, for example, by adding a crystal nucleating agent to an olefin resin composition that forms the second olefin resin layer, melting the mixture, and cooling the result. In this case, the cooling method for use is, for example, a chilled roll technique in which a material extruded from a die during extrusion molding is brought into contact with a cooling roll (chilled roll) that contains cold water inside thereof.

Examples of crystal nucleating agents include metal salt-based crystal nucleating agents, such as fatty acid metal salts, phosphonic acid metal salts, phosphate metal salts, benzoic acid metal salts, pimelic acid metal salts, and rosin metal salts; organic crystal nucleating agents, such as fatty acid esters, aliphatic amides, benzylidene sorbitol, quinacridone, and cyanine blue; and inorganic crystal nucleating agents, such as talc.

These crystal nucleating agents encapsulated in a nanoshell may also be used for a crystal nucleating agent. The use of a crystal nucleating agent embedded in a nanoshell enables the crystal nucleating agent to disperse more homogeneously in the second olefin resin layer, making it easier to adjust indentation hardness $H_{IT}^2$ in a stable manner without influence of melting conditions, cooling conditions, etc., while providing excellent scratch resistance and excellent bending workability.

In the present invention, the term "nanoshell" refers to a "nanosized, membrane-structured, hollow vesicle in a closed shell form" that preferably has a mean primary particle size of less than 380 nm, and more preferably 375 nm or less. The mean primary particle size refers to a value calculated by statistical processing of an observed image measured with a transmission electron microscope (TEM) or scanning transmission electron microscope (STEM). The calculation by statistical processing was performed, specifically, by measuring the diameter of 1000 particles randomly selected from an SEM image, preparing a histogram with a 3-nm segment, and performing computation with the following formula (A). The number average primary particle size $D_{np}$ calculated from formula (A) was determined to be the mean primary particle size in this specification.

$$D_{np} = \Sigma n_i d_i / \Sigma n_i \quad (A)$$

$D_{np}$: number average molecular weight
$d_i$: diameter in "i" in histogram
$n_i$: frequency In the present invention, the mean primary particle size of nanoshells is shorter than the wavelength of the visible light region (380 to 750 nm), and is about ½ or less of the wavelength of visible light; i.e., the mean primary particle size of nanoshells is preferably less than 380 nm. More specifically, the mean primary particle size of nanoshells is preferably 1 nm or more and less than 380 nm, more preferably 1 to 375 nm, still more preferably 5 to 300 nm, yet more preferably 10 to 250 nm, and particularly preferably 15 to 200 nm. A mean primary particle size within these numerical ranges makes it easier to adjust the indentation hardness of the second olefin resin layer, providing excellent scratch resistance and bending workability.

The nanoshell is not particularly limited, as long as the crystal nucleating agent can be encapsulated in the shell. The nanoshell may be a monolayer film or a multilayer film. From the standpoint of efficiently improving excellent scratch resistance and bending workability by decreasing the mean primary particle size to increase the dispersibility of the crystal nucleating agent, the shell is preferably a monolayer film. The material for forming a nanoshell is preferably a phospholipid from the standpoint of more easily adjusting the indentation hardness of the second olefin resin layer to achieve excellent scratch resistance and bending workability.

In the present invention, the morphology of the nanoshell is more preferably a monolayer film formed of a phospholipid. Because a nanoshell formed of a phospholipid exhibits increased compatibility with the resin that forms the second olefin resin layer, such a nanoshell is advantageous in adjusting the indentation hardness of the second olefin resin layer to achieve excellent scratch resistance and bending workability. Additionally, because a monolayered nanoshell has a smaller mean primary particle size, the synergy with increased dispersibility due to the phospholipid that forms the nanoshell enhances the dispersibility of the crystal nucleating agent; and enables more efficient adjustment of the indentation hardness of the second olefin resin layer, thus achieving excellent scratch resistance and bending workability.

Examples of phospholipids include glycerophospholipids, such as phosphatidylcholine, phosphatidylethanolamine, phosphatidylserine, phosphatidic acid, phosphatidylglycerol, phosphatidylinositol, cardiolipin, egg-yolk lecithin, hydrogenated egg-yolk lecithin, soybean lecithin, and hydrogenated soybean lecithin; and sphingophospholipids, such as sphingomyelin, ceramide phosphoethanolamine, and ceramide phosphorylglycerol. These phospholipids may be used singly, or in a combination of two or more.

Examples of the technique for encapsulating the crystal nucleating agent in a nanoshell include the Bangham method, extrusion, hydration, surfactant dialysis, reverse-phase evaporation, freezing and thawing, and supercritical reverse-phase evaporation.

The Bangham method includes: adding a phospholipid to a solvent, such as chloroform or methanol, to dissolve it; removing the solvent with an evaporator to form a thin film of the phospholipid; adding a crystal nucleating agent thereto; and stirring the mixture with a mixer at high speed of, for example, about 1000 to 2500 rpm for hydration and dispersion to encapsulate the crystal nucleating agent in a nanoshell. Extrusion includes filtration using a filter in place of a mixer used as an external agitator. Hydration is the same as the Bangham method in which, although a mixer is not used, the mixture is gently stirred to disperse the crystal nucleating agent and encapsulate the agent in a nanoshell. Reverse-phase evaporation includes dissolving a phospholipid in a solvent, such as diethyl ether or chloroform; adding the crystal nucleating agent as described above (or a dispersion of the crystal nucleating agent) thereto to form a W/O emulsion; removing the solvent from the emulsion under reduced pressure; and adding water to encapsulate the crystal nucleating agent in a nanoshell. Freezing and thawing involves at least either cooling or heating as an external agitation, and encapsulating a crystal nucleating agent in a nanoshell by repeating cooling or heating.

The use of supercritical reverse-phase evaporation enables the preparation of a nanoshell in the form of a monolayer film formed of a phospholipid more reliably and easily. Supercritical reverse-phase evaporation encapsulates a crystal nucleating agent in a nanoshell using carbon dioxide in a supercritical state, or at or above its critical temperature or critical pressure. Carbon dioxide in a supercritical state refers to carbon dioxide in a supercritical state at or above its critical temperature (30.98° C.) and at or above its critical pressure (7.3773±0.0030 MPa). Carbon dioxide at or above its critical temperature or critical pressure refers to carbon dioxide in a state in which either the temperature or the pressure, but not both, has exceeded the critical point.

Specifically, supercritical reverse-phase evaporation involves adding water to a mixture of a crystal nucleating agent, supercritical carbon dioxide, and a phospholipid; stirring the mixture to form an emulsion of supercritical carbon dioxide and an aqueous phase; and depressurizing the emulsion to expand and evaporate carbon dioxide, thereby causing reverse phase, which leads to the formation of a nanoshell in which the surface of the crystal nucleating agent is covered with a monolayer film of the phospholipid, thus giving the crystal nucleating agent encapsulated in the nanoshell. In the need to form a traditional multilayered film, supercritical carbon dioxide is added to the mixture of a crystal nucleating agent, a phospholipid, and water in the method described here.

In the present invention, the nanoshell may be formed of a material other than phospholipids, for example, a dispersant, such as polymer surfactants having a molecular weight of about 10000 to 500000, preferably about 15000 to 300000, and more preferably about 20000 to 200000, including aliphatic polyvalent polycarboxylic acid, polycarboxylic acid alkyl amine, and poly(meth)acrylic acid; fatty acid metal salts formed from a saturated or unsaturated fatty acid having preferably 10 to 30 carbon atoms, and more preferably 12 to 28 carbon atoms, such as lauric acid, myristic acid, stearic acid, behenic acid, montanoic acid, and ricinoleic acid, and a metal bonded to the saturated or unsaturated fatty acid, such as lithium, sodium, potassium, magnesium, calcium, barium, zinc, and aluminum; silane coupling agents, including (meth)acryloxy silane coupling agents, such as (meth)acryloxy propyltriethoxysilane and (meth) acryloxypropyltrimethoxysilane, vinyl silane coupling agents, such as vinyl triethoxysilane and vinyltrimethoxysilane, epoxy silane coupling agents, such as (epoxycyclohexyl)ethyl trimethoxy silane and glycidoxypropyltrimethoxysilane, isocyanate silane coupling agents, such as isocyanate propyltriethoxysilane, and phenyl silane coupling agents, such as phenyltrimethoxy silane; titanate coupling agents, such as tetrakis[bis(allyloxymethyl)butoxy] titanium, dipropoxy titanium dioxy stearate, (butoxycarbonyl benzoyloxy) tributoxy titanium, isopropyl titanium triisostearate, dibutoxy-bis(triethanolaminato) titanium, tetrakis(ethylhexyloxy) titanium, and dipropoxy-bis(acetylacetonato) titanium; silicone oils, such as dimethyl silicone oil, methylphenyl silicone oil, methyl hydrogen silicone oil, cyclic dimethyl silicone oil, alkyl-modified silicone oil, long-chain alkyl-modified silicone oil, and higher fatty acid-modified silicone oil; wax, including hydrocarbon-based wax, such as polypropylene wax, polyethylene wax, polypropylene-polyethylene copolymer wax, microcrystalline wax, paraffin wax, Fischer-Tropsch wax, and Sasol wax, ester wax of aliphatic carboxylic acid having preferably 10 to 30 carbon atoms, and more preferably 12 to 24 carbon atoms with dipentaerythritol, and deoxidized wax, such as carnauba wax, and montan wax; and modified resin prepared by modifying polyolefin resin with an organic acid, such as maleic acid, sulfonic acid, carboxylic acid, or rosin acid. These dispersants may be used singly, or in a combination of two or more.

An example of the method for preparing a crystal nucleating agent encapsulated in a nanoshell is explained in more detail, taking as an example the case in which a phosphate metal salt-based crystal nucleating agent (sodium 2,2'-methylenebis(4,6-di-tert-butylphenyl)phosphate) is used as a crystal nucleating agent.

100 parts by mass of an organic solvent, such as methanol, 60 to 100 parts by mass of the phosphate metal salt-based crystal nucleating agent as a crystal nucleating agent, and 2 to 10 parts by mass of phosphatidylcholine as a phospholipid are placed in a vessel maintained at 40 to 70° C., and sealed. Carbon dioxide is supplied to the vessel such that the internal pressure reaches 7.5 to 25 MPa to create a supercritical state. Subsequently, the content inside the vessel is stirred at a high-speed rotation of about 1000 to 2500 rpm, and 50 to 150 parts by mass of ion-exchanged water is supplied thereto. While the temperature and pressure are maintained in a supercritical state, stirring is continued for about 10 to 25 minutes. Carbon dioxide is then discharged from the vessel, and the pressure inside the vessel is returned to atmospheric pressure, thereby preparing a crystal nucleating agent encapsulated in a single-layered nanoshell formed of a phospholipid (a phosphate metal salt-based crystal nucleating agent). The obtained crystal nucleating agent encapsulated in a nanoshell has a mean primary particle size of about 10 to 250 nm.

The content of the crystal nucleating agent in the second olefin resin layer is preferably 0.01 to 5 parts by mass, more preferably 0.02 to 3 parts by mass, still more preferably 0.03 to 1 parts by mass, and particularly preferably 0.05 to 0.5 parts by mass, per 100 parts by mass of the resin component that forms the second olefin resin layer. An amount of the crystal nucleating agent within these ranges can easily and homogeneously disperse in the resin that forms the second olefin resin layer; this makes it easier to bring about the effect of the crystal nucleating agent, while enabling the adjustment of indentation hardness $H_{IT}^2$ in an easier and stable manner, further providing excellent scratch resistance and bending workability.

From the standpoint of achieving excellent scratch resistance and bending workability, the second olefin resin layer has a thickness of preferably 30 to 120 μm, more preferably 40 to 110 μm, still more preferably 50 to 100 μm, and particularly preferably 55 to 85 μm. A thickness of less than 30 μm may result in poor scratch resistance or impact resistance (in particular, dent resistance), or elongation of the second olefin resin layer due to tension added during printing for providing a print or coating with a printer. A thickness of more than 120 μm may result in cracks and fractures on the surface-protecting layer during the bending process, or poor impact resistance (in particular, crack resistance).

Surface-Protecting Layer

The surface-protecting layer is an outermost layer of the decorative sheet and exposed, as illustrated in FIGS. 1 and 2; and is provided to improve the surface properties, such as stain resistance, scratch resistance, and chemical resistance, of the decorative sheet. Indentation hardness $H_{IT}^1$ of the surface-protecting layer must satisfy the following formula (2).

$$H_{IT}^1 > H_{IT}^2 \tag{2}$$

Indentation hardness $H_{IT}^1$ of the surface-protecting layer must be higher than indentation hardness $H_{IT}^2$ of the second olefin resin layer for providing scratch resistance under relatively high load, and must also exceed 100 MPa.

The indentation hardness can be suitably adjusted, for example, by mixing two or more resins of different hardness, or by mixing a resin with an elastomer.

From the standpoint of scratch resistance, indentation hardness $H_{IT}^1$ is preferably 170 MPa or more, more preferably 250 MPa or more, still more preferably 300 MPa or more, and yet more preferably 350 MPa or more.

From the standpoint of bending workability, indentation hardness $H_{IT}^1$ preferably satisfies the following formula (3); and is preferably 400 MPa or less, more preferably 350 MPa or less, and still more preferably 320 MPa or less.

$$450 \text{ MPa} > H_{IT}^1 \tag{3}$$

The preferable upper limit and lower limit of indentation hardness $H_{IT}^1$ in multiple numerical ranges may be combined. For example, the maximum value of the lower limit and the maximum value of the upper limit may be combined to determine the range of $H_{IT}^1$ to be 350 MPa or more, and less than 450 MPa.

From the standpoint of increasing the surface properties of the decorative sheet, such as stain resistance, scratch resistance, and chemical resistance, while satisfying the indentation hardness, the surface-protecting layer is preferably formed from a cured product of a curable resin composition. Examples of curable resin compositions include resin compositions containing curable resins, such as thermosetting resins, two-component curable resins, and ionizing radiation-curable resins. From the standpoint of achieving better surface properties, a resin composition containing a two-component curable resin or an ionizing radiation-curable resin as a curable resin is preferable.

The two-component curable resin can be any two-component curable resin, as long as a base resin is cured when combined with a curing agent. The two-component curable resin is preferably a two-component curable urethane resin composed of a polyol (polyhydric alcohol; a base resin) and an isocyanate curing agent (a curing agent).

Preferable examples of base resins include polyols, such as polyethylene glycol, polypropylene glycol, butylene glycol, neopentylglycol, and 1,6-hexanediol; and polyols containing hydroxy as a functional group, such as acrylic polyol, polyester polyol, and polyether polyol. These base resins can be used singly, or in a combination of two or more.

The isocyanate curing agent for use may be a known compound. Examples of isocyanate curing agents for use include the following polyisocyanates: aromatic isocyanates, such as 2,4-tolylene diisocyanate (TDI), xylene diisocyanate (XDI), and naphthalene diisocyanate; and aliphatic (or alicyclic) isocyanates, such as 1,6-hexamethylene diisocyanate (HMDI), isophorone diisocyanate (IPDI), methylene diisocyanate (MDI), and hydrogenated tolylene diisocyanate. Additionally, adducts or multimers of these isocyanates, for example, an adduct of tolylene diisocyanate or a trimer of tolylene diisocyanate, may also be used.

The ionizing radiation-curable resin refers to resins that are cured when exposed to ionizing radiation (i.e., among electromagnetic waves and charged particle radioactive rays, radioactive rays that have an energy quantum capable of polymerizing or crosslinking molecules, including ultraviolet rays (UV); electron beams (EB); electromagnetic waves, such as X-rays and γ-rays; and charged particle radioactive rays, such as α-rays and ion beams). Specifically, the ionizing radiation-curable resin for use can be suitably selected from commonly used polymerizable monomers, polymerizable oligomers, and prepolymers.

The polymerizable monomers are preferably (meth)acrylate monomers that have a radical polymerizable unsaturated group in the molecule; and particularly preferably polyfunctional (meth)acrylate monomers. Any (meth)acrylate monomers that have two or more ethylenically unsaturated bonds in the molecule can be used as a polyfunctional (meth)acrylate monomer. Preferable examples include diethylene glycol di(meth)acrylate, propylene glycol di(meth)acrylate, trimethylol propane tri(meth)acrylate, dipentaerythritol tetra(meth)acrylate, dipentaerythritol penta(meth)acrylate, and dipentaerythritol hexa(meth)acrylate. These (meth)acrylate monomers may be used singly, or in a combination of two or more.

Preferable polymerizable oligomers include oligomers having a radical polymerizable unsaturated group in the molecule, such as (meth)acrylate oligomers including urethane (meth)acrylate oligomers, epoxy (meth)acrylate oligomers, polyester (meth)acrylate oligomers, polyether (meth)acrylate oligomers, and acrylic (meth)acrylate oligomers. These polymerizable oligomers may be used singly, or in a combination of two or more.

The curable resin composition may contain, in addition to the curable resins described above, a dispersant described below etc.

The curable resin composition may include, as additives, ultraviolet absorbers, ultraviolet shielding agents, light stabilizers, abrasion resistance improvers, polymerization inhibitors, crosslinking agents, infrared absorbers, antistatic agents, adhesiveness improvers, leveling agents, thixotropic agents, coupling agents, plasticizers, antifoaming agents, fillers, antiblocking agents, lubricants, and solvents, to an extent that the purpose of the present invention is not lost. In particular, for improving weatherability, the curable resin composition preferably contains weather-resistant agents, such as an ultraviolet absorber, and a light stabilizer.

Examples of ultraviolet absorbers include benzophenone-based ultraviolet absorbers, benzotriazole-based ultraviolet absorbers, triazine-based ultraviolet absorbers, salicylate-based ultraviolet absorbers, and acrylonitrile-based ultraviolet absorbers. Examples of light stabilizers include hindered amine-based light stabilizers, acrylate-based light stabilizers, oxamide-based light stabilizers, and cyanoacrylate-based light stabilizers.

The surface-protecting layer may contain a dispersant.

The dispersant includes polymer surfactants, fatty acid metal salts, silane coupling agents, titanate coupling agents, silicone oils, wax, modified resins, and the like, listed above as examples of the materials capable of forming the nanoshell. These dispersants may be used singly, or in a combination of two or more.

The dispersant for use may be a dispersant encapsulated in a nanoshell. The "nanoshell" in the "dispersant encapsulated in a nanoshell" may be the same nanoshell as in the "crystal nucleating agent encapsulated in a nanoshell" for the second olefin resin layer. The method for preparing the nanoshell is also the same as that for the crystal nucleating agent encapsulated in a nanoshell.

Adding such a dispersant encapsulated in a nanoshell and inorganic microparticles described later helps to increase the indentation hardness.

An example of the method for preparing a dispersant encapsulated in a nanoshell is explained in more detail, taking as an example the case in which methacryloxypropyltrimethoxysilane is used as a dispersant.

100 parts by mass of an organic solvent, such as methanol, 40 to 80 parts by mass of methacryloxypropyltrimethoxysilane as a dispersant, and 2 to 10 parts by mass of phosphatidylcholine as a phospholipid are added to a vessel maintained at 40 to 70° C., and sealed. Carbon dioxide is added to the vessel such that the internal pressure reaches 7.5 to 25 MPa to create a supercritical state. Subsequently, the content inside the vessel is stirred at a high-speed rotation of about 1000 to 2500 rpm, and 50 to 150 parts by mass of ion-exchanged water is supplied thereto. While the temperature and pressure are maintained in a supercritical state, stirring is continued for about 10 to 25 minutes. Carbon dioxide is then discharged from the vessel, and the pressure inside the vessel is returned to atmospheric pressure, thereby preparing a dispersant (methacryloxypropyltrimethoxysilane) encapsulated in a single-layered nanoshell formed of a phospholipid.

The thus-obtained dispersant encapsulated in a nanoshell has a mean primary particle size of preferably less than 380 nm, as with the mean primary particle size of the crystal nucleating agent encapsulated in a nanoshell described above; more specifically, the dispersant has a mean primary particle size of preferably 1 nm or more and less than 380 nm, more preferably 1 to 375 nm, still more preferably 5 to 300 nm, yet more preferably 10 to 250 nm, and particularly preferably 15 to 200 nm.

The content of the dispersant is preferably 0.01 to 30 parts by mass, more preferably 0.05 to 15 parts by mass, still more preferably 0.1 to 10 parts by mass, and particularly preferably 0.3 to 5 parts by mass, per 100 parts by mass of the resin component that forms the surface-protecting layer.

The surface-protecting layer preferably further contains inorganic microparticles from the standpoint of increasing scratch resistance. The inorganic microparticles include silica, alumina, aluminosilicate, kaolinite, calcium carbonate, barium sulfate, and glass.

The mean particle size of inorganic microparticles is not limited, and is preferably 20 µm or less. In particular, the mean particle size of inorganic microparticles is preferably 1 to 20 µm, and more preferably 2 to 15 µm.

The mean particle size of inorganic microparticles refers to 50% particle size (d50: median diameter) determined by measuring the particles in a solution by dynamic light scattering, and showing the particle size distribution in volume cumulative distribution. The 50% particle size can be measured, for example, with a Microtrac particle size analyzer (Nikkiso Co., Ltd.).

The content of the inorganic microparticles is preferably 1 to 30 parts by mass, more preferably 2 to 25 parts by mass, and still more preferably 5 to 20 parts by mass, per 100 parts by mass of the resin component that forms the surface-protecting layer.

The thickness of the surface-protecting layer is preferably 3 to 45 µm, more preferably 5 to 35 µm, and still more preferably 10 to 30 µm. A thickness of the surface-protecting layer within these ranges provides excellent surface properties, together with the first olefin resin layer and the second olefin resin layer.

Other Layers

The decorative sheet according to the present invention may contain, for example, an ornamental layer, a primer layer, and an adhesive layer, depending on the intended use, in addition to the first olefin resin layer, the second olefin resin layer, and the surface-protecting layer.

Ornamental Layer

The decorative sheet according to the present invention may contain an ornamental layer from the standpoint of increasing designability. The ornamental layer may be provided, for example, between the first olefin resin layer and the second olefin resin layer, between the second olefin resin layer and the surface-protecting layer, or on the surface-protecting layer.

The ornamental layer may be, for example, a colored layer that covers the entire surface ("solid color layer"), a picture layer on which a variety of patterns are printed with ink and a printer, or a combination of them. Such an ornamental layer may be provided to multiple areas of a single layer; or provided not to a single layer, but to multiple layers.

For example, when the ground color of the decorative plate base is masked by coloring, providing a solid color layer can increase the designability, while masking the ground color. Additionally, from the standpoint of increasing designability, a solid color layer and a picture layer may be combined. When the base picture of the decorative plate base should be preserved, only a picture layer may be provided without a solid color layer.

The ink for use in the ornamental layer is that prepared by mixing a binder with a colorant, such as a pigment and a dye, an extender pigment, a solvent, a stabilizer, a plasticizer, a catalyst, a curing agent, an ultraviolet absorber, a light stabilizer, and the like.

The binder is not particularly limited. Preferable examples of the binder include resins, such as urethane resins, acrylic polyol resins, acrylic resins, ester resins, amide resins, butyral resins, styrene resins, urethane-acrylic copolymers, polycarbonate-based urethane-acrylic copolymers (an urethane-acrylic copolymer derived from a polymer having 2 or more hydroxyl groups in the terminals and side chains, with carbonate bonds in the polymer main chain (polycarbonate polyol)), vinyl chloride-vinyl acetate copolymer resins, vinyl chloride-vinyl acetate-acrylic copolymer resins, chlorinated propylene resins, nitrocellulose resins, and cellulose acetate resins. These binders may be used singly, or in a combination of two or more.

The colorant for use may be, for example, inorganic pigments, such as white pigments, iron black, chrome yellow, titanium yellow, red oxide, cadmium red, ultramarine blue, and cobalt blue; organic pigments or dyes, such as quinacridone red, isoindolinone yellow, and phthalocyanine blue; metal pigments formed of foil flakes of aluminum, brass, etc.; and pearl-like luster pigments (pearl pigments) formed of foil flakes of titanium dioxide-coated mica, basic lead carbonate, etc., from the standpoint of masking the ground color of the decorative plate base as well as increasing designability.

When the decorative sheet contains a picture layer as an ornamental layer, the pattern includes wood-grain patterns; marble grain patterns mimicking the surface of rocks, such as marble patterns (e.g., travertine marble patterns); fabric patterns mimicking fabric texture or fabric-like patterns; tiled patterns; brick-masonry patterns; parquet patterns, which are combinations thereof; and patchwork patterns. These patterns are formed by polychromic printing with typical process colors (yellow, red, blue, and black), or polychromic printing that uses individual color plates that constitute a pattern.

The thickness of the ornamental layer can be suitably selected depending on the desired pattern. From the standpoint of masking the ground color of the decorative plate base and increasing designability, the thickness of the ornamental layer is preferably 0.5 to 20 µm, more preferably 1 to 10 µm, and still more preferably 2 to 5 µm.

Primer Layer

The primer layer is provided largely for the purpose of increasing the adhesion between the layers.

The primer layer is provided, for example, on one surface or both surfaces of the first olefin resin layer, or on one surface or both surfaces of the second olefin resin layer of the decorative sheet according to the present invention. To increase the adhesion between the layers, one surface or both surfaces of the first olefin resin layer and/or the second olefin resin layer may be subjected to surface treatment, such as physical surface treatment (e.g., an oxidation method or a projection-and-depression formation method), or chemical surface treatment, as with the primer layer.

The primer layer can be formed, for example, from a resin composition prepared by suitably mixing a binder among the binders listed as examples for the ornamental layer, with a solvent, a stabilizer, a plasticizer, a catalyst, a curing agent, an ultraviolet absorber, a light stabilizer, and the like.

From the standpoint of increasing adhesion, the thickness of the primer layer is preferably 0.2 to 10 µm, more preferably 0.5 µm to 8 µm, and still more preferably 1 to 5 µm.

Synthetic-Resin Backer Layer

The decorative sheet according to the present invention may be provided with a synthetic-resin backer layer on the undermost layer of the decorative sheet (i.e., on the side of the first olefin resin layer of the decorative sheet). Providing a synthetic-resin backer layer further increases the impact resistance of the decorative material.

Examples of the resin that constitutes a synthetic-resin backer layer include polypropylene, ethylene-vinyl alcohol copolymers, polymethylene, polymethyl pentene, polyethylene terephthalate, highly heat-resistant polyalkylene terephthalate (e.g., polyethylene terephthalate prepared by replacing a portion of ethylene glycol with 1,4-cyclohexane dimethanol, diethylene glycol, etc.; "PET-G," trade name, Eastman Chemical Company), polybutylene terephthalate, polyethylene naphthalate, polyethylene naphthalate-isophthalate copolymers, polycarbonate, polyarylate, polyimide, polystyrene, polyamide, and ABS. These resins may be used singly, or in a combination of two or more.

The thickness of the synthetic-resin backer layer is preferably 0.1 to 0.6 mm, more preferably 0.15 to 0.45 mm, and still more preferably 0.20 to 0.40 mm. A lower limit of the thickness of the synthetic-resin backer layer within these ranges further increases the impact resistance of the decorative sheet. An upper limit of the thickness of the synthetic-resin backer layer within these ranges further reduces or prevents the warpage of the decorative sheet.

Depressions

The decorative sheet according to the present invention may have depressions (e.g., embossed depressions) on the side of the surface-protecting layer. Such depressions make the sheet appear luxurious due to improved quality (texture) of the decorative sheet, increasing designability.

The depressions may be present at least on the surface-protecting layer of the decorative sheet according to the present invention. The depression depth may be a depth such that the depressions remain within the surface-protecting layer, or that some may reach the first olefin resin layer. From the standpoint of achieving excellent quality (texture), depressions are preferably a combination of those remaining within the surface-protecting layer, those reaching the second olefin resin layer, and those reaching the first olefin resin layer.

Examples of the pattern of the depressions include wood-grain vessel patterns, stone sheet surface projection-depression patterns, textile surface textures, matte patterns, grain patterns, hairline patterns, and linear streak patterns. From the standpoint of increasing designability, the pattern of depressions is preferably in conformity with the pattern of the ornamental layer. For example, when the picture layer has a wood-grain pattern, a luxurious decorative sheet with a realistic and quality texture can be obtained by selecting a wood-grain vessel pattern for depressions to bring the wood-grain pattern of the picture layer in conformity with the wood-grain pattern of the depressions.

Method for Producing a Decorative Sheet

The following describes an example of the method for producing the decorative sheet according to the present invention. This method produces, as a decorative sheet according to the present invention in a preferable embodiment, a decorative sheet containing, in sequence in the thickness direction, a first olefin resin layer, an ornamental layer, a second olefin resin layer, and a surface-protecting layer.

First, a resin composition for forming the first olefin resin layer is prepared, and a first olefin resin layer is formed by a method such as melt extrusion. Then, an ornamental layer is formed on the first olefin resin layer.

Separately, a resin composition for forming the second olefin resin layer is prepared, and a second olefin resin layer is formed by a method such as melt extrusion. Then, a curable resin composition is applied onto the second olefin resin layer. This uncured layer is then heated or irradiated with ionizing radiation to cure the layer, thereby forming a surface-protecting layer.

Subsequently, an adhesive is applied onto the surface of at least one of the ornamental layer and the second olefin resin layer; and the ornamental layer and the second olefin resin layer are adhered such that the layers face each other, thereby preparing a decorative sheet containing the first olefin resin layer, the ornamental layer, the second olefin resin layer, and the surface-protecting layer in sequence.

In the production method described above, after the ornamental layer is formed, the second olefin resin layer may be formed from a resin composition for forming the second olefin resin layer, and laminated thereon by extrusion lamination, dry lamination, wet lamination, thermal lamination, etc., through a thermoplastic resin, such as an adhesive and/or acid-modified polyolefin resin, for adhesion and pressure bonding. Subsequently, an uncured layer formed by applying a curable resin composition on the second olefin resin layer is heated or irradiated with ionizing radiation to cure the layer, thereby forming the surface-protecting layer. This procedure can also produce a decorative sheet containing the first olefin resin layer, the ornamental layer, the second olefin resin layer, and the surface-protecting layer in sequence.

The ornamental layer is formed by applying ink used for forming an ornamental layer on the first olefin resin layer or the second olefin resin layer to form a desired colored layer or a picture layer. The ink is applied by a known technique, such as gravure printing, bar coating, roll coating, reverse roll coating, or comma coating; and is preferably performed by gravure printing.

The curable resin composition to form a surface-protecting layer is preferably applied by a known technique, such as gravure coating, bar coating, roll coating, reverse roll coating, or comma coating; and more preferably by gravure coating, such that the cured layer has a predetermined thickness.

When an ionizing radiation resin composition is used for forming a surface-protecting layer, the uncured resin layer formed by applying the resin composition is exposed to ionizing radiation, such as electron beams or ultraviolet rays, to prepare a cured product, thereby forming a surface-protecting layer. When electron beams are used for ionizing radiation, the accelerating voltage can be suitably selected according to the resin for use, and the thickness of the layer. Typically, the uncured resin layer is preferably cured at an accelerating voltage of about 70 to 300 kV.

The irradiation dose is preferably such a dose that the crosslink density of the ionizing radiation-curable resin is saturated, and is typically selected from the range of 5 to 300 kGy (0.5 to 30 Mrad), and preferably from the range of 10 to 50 kGy (1 to 5 Mrad).

The source of the electron beams is not particularly limited. For example, various types of electron-beam accelerators can be used, such as a Cockcroft-Walton accelerator, a Van de Graaff accelerator, a resonant transformer accelerator, an insulated core transformer accelerator, a linear accelerator, a Dynamitron accelerator, or a high-frequency accelerator.

When ultraviolet rays are used for ionizing radiation, those containing ultraviolet rays with a wavelength of 190 to 380 nm are used. The source of the ultraviolet rays is not particularly limited. Examples of the source of ultraviolet rays for use include high-pressure mercury lamps, low-pressure mercury lamps, metal halide lamps, and carbon arc lamps.

When a thermosetting resin composition is used for forming a surface-protecting layer, the resin composition may be subjected to heat treatment suitable for the composition, and cured to form a surface-protecting layer.

When a primer layer is provided, a resin composition for forming a primer layer is applied by a known technique, such as gravure printing, bar coating, roll coating, reverse roll coating, or comma coating, to form a primer layer.

When a synthetic-resin backer layer is provided, a synthetic-resin backer layer is formed by a known technique, for example, by laminating a synthetic-resin backer layer prepared by T-die extrusion or the like, and a first olefin resin layer by thermal lamination or dry lamination through an adhesive.

When depressions are formed, embossing is preferably used, taking into consideration the ease of workability. Embossing may be performed by a typical method using a known sheet-fed embossing machine, or a rotary embossing machine.

2. Decorative Plate

The decorative plate according to the present invention contains a laminate containing, in sequence in the thickness direction, a decorative plate base and the decorative sheet according to the present invention.

Figure 3:
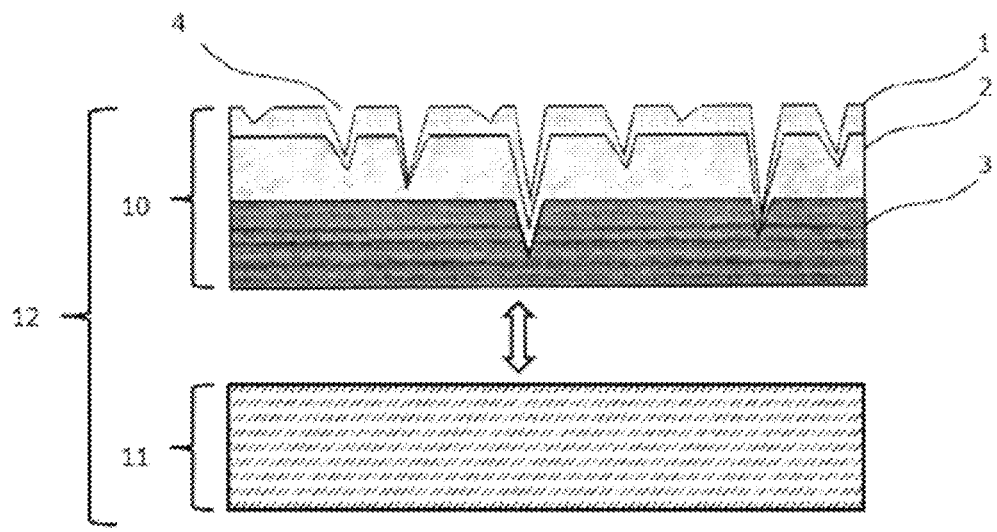
FIG. 3 is a cross-sectional diagram that illustrates a decorative plate formed by combining the decorative sheet according to the present invention with a decorative plate base.

FIG. 3 illustrates an example of a decorative plate 12 in which the decorative sheet 10 according to the present invention is stacked on a decorative plate base 11 in this order (the surface opposite the surface-protecting layer side of the decorative sheet 10 is adhered to the decorative plate base 11).

The decorative plate base is, although not limited to, for example, at least one member selected from medium-density wood fiberboards, high-density wood fiberboards, particleboards, coniferous tree plywood, broadleaf tree plywood, fast-growing tree plywood, cork sheets, cork-containing composite base materials, thermoplastic resin sheets (resin plates containing polyvinyl chloride resin, polypropylene resin, polyethylene resin, acrylic resin, ABS resin, etc., as its main component or those obtained by foaming these resin plates), and the like. These decorative plate bases may be used singly, or two or more of these decorative plate bases may be combined and laminated for use.

Examples of coniferous trees include Sakhalin fir, Japanese larch, Yezo spruce, Japanese cedar, hinoki cypress, pine, sequoia, and Hondo spruce. Examples of broadleaf trees include lauan, Japanese linden, birch, castor aralia, Japanese beech, oak, and meranti. Examples of fast-growing trees include poplar, falcata, acacia, Kamerere, eucalyptus, and Terminalia.

When a plywood, such as a coniferous tree plywood, broadleaf tree plywood, or fast-growing tree plywood, is used, the number of stacked plywood layers (number of plies) is not limited. Typically, it is preferable that the number of plies be 3 to 7, and more preferably 5 to 7. The adhesive for use in producing plywood is also not limited. A wide range of known woodworking adhesives may be used.

Examples of adhesives include adhesives containing, as an active ingredient, polyvinyl acetate, polyvinyl chloride, vinyl chloride-vinyl acetate copolymers, ethylene-acrylic acid copolymers, ionomers, butadiene-acrylonitrile rubber, neoprene rubber, and natural rubber. Examples also include heat-curable adhesives, such as melamine-based adhesives, phenol-based adhesives, and urea-based (e.g., vinyl acetate-urea-based) adhesives.

The thickness of the decorative plate base is not limited, and is preferably about 2 to 15 mm, and more preferably about 2 to 12 mm.

The method for laminating the decorative sheet and the decorative plate base is not limited. For example, the decorative sheet can be bonded to the decorative plate base using an adhesive. The adhesive may be suitably selected from known adhesives according to, for example, the type of the decorative plate base. Examples thereof include polyvinyl acetate, polyvinyl chloride, vinyl chloride-vinyl acetate copolymers, ethylene-acrylic acid copolymers, ionomers, reactive hot-melt adhesives, such as urethane-based reactive hot-melt adhesives ("PUR-based adhesive"), butadiene-acrylonitrile rubber, neoprene rubber, and natural rubber. These adhesives may be used singly, or in a combination of two or more.

The decorative sheet according to the present invention is excellent in both bending workability and scratch resistance under high-load conditions, and is useful as a decorative material.

EXAMPLES

The following describes the present invention in more detail with reference to Examples. However, the present invention is not limited to the Examples.

The decorative sheets prepared in the Examples were evaluated for the nature or properties in accordance with the following measurement methods.
Evaluation Method
(1) Indentation Hardness ($H_{IT}$)

In accordance with the method described in this specification, indentation hardness $H_{IT}^1$ of the surface-protecting layer, indentation hardness $H_{IT}^2$ of the second olefin resin layer, and indentation hardness $H_{IT}^3$ of the first olefin resin layer were measured.
(2) Scratch Resistance Test (Coin Scratch Test)

The decorative sheets prepared in the Examples and Comparative Examples were individually bonded onto a medium-density fiberboard (MDF: decorative plate base) with a thickness of 2.5 mm through a water-soluble emulsion-based adhesive, thereby preparing decorative plates. The water-soluble emulsion-based adhesive for use was the following:
Water-Soluble Emulsion-Based Adhesive
Base Resin: BA-10L, Japan Coating Resin Co., Ltd., modified-ethylene-vinyl acetate-based resin
Curing Agent: BA-11B, Japan Coating Resin Co., Ltd., isocyanate-based agent
Compositional Ratio: Base Resin:curing Agent=100:2.5 (on a Mass Basis)

The scratch resistance of these decorative plates was evaluated by performing a coin scratch test. Specifically, two 10-yen coins tilted at a 45° angle were brought into contact with the surface of a decorative sheet of the test specimen (the surface of the surface-protecting layer). While a load (a load of 4 kg, 6 kg, and 7 kg) was applied thereon, the coins were dragged in the horizontal direction, and the condition of scratches was evaluated.

The evaluation criteria were as described below. A rating of B or higher (i.e., A or B) is a pass.
Judgement Criteria
A: No scratches are observed under a load of 7 kg.
B: Scratches are observed under a load of 7 kg; however, no scratches are observed under a load of 6 kg.
C: No scratches are observed under a load of 4 kg; however, scratches are observed under a load of 6 kg.
(3) Bending Workability The bending workability of the decorative sheets prepared in the Examples and Comparative Examples was evaluated. Specifically, a decorative sheet was wound around a metallic rod (diameter: 3 mm) such that the first olefin resin layer of the sheet came in contact with the rod, and whether cracks were present in the surface-protecting layer was examined. The evaluation criteria were as described below.
Judgement Criteria
A: No cracks are visually observed.
B: Although very small cracks are visually observed during careful observation, they are not considered to affect performance.
C: Cracks are clearly observed in visual observation.
(4) Impact Resistance (Du Pont Impact Test)

The impact resistance of the decorative plates prepared in the Examples and Comparative Examples was evaluated with a Du Pont impact tester (following JIS K5600-5-3). Specifically, a spindle with a predetermined weight was dropped from a height of 100 mm on the surface of the decorative sheet of a decorative plate, and whether cracks were present in the decorative sheet was evaluated. The evaluation criteria were as described below.
A: No cracks are visually observed.
B: Very small cracks are visually observed during careful observation.
C: Cracks are clearly observed in visual observation.
(5) Stain Resistance after Du Pont Impact Test The stain resistance of the decorative sheets prepared in the Examples and Comparative Examples was evaluated in accordance with the following method.

An oil-based black marker (Teranishi Chemical Industry Co., Ltd.) was applied on the portion of the decorative sheet on which the Du Pont impact test in section (4) was previously performed. Immediately afterward, the ink was wiped off with a solvent (ethanol), and the state of the remaining black marker was visually evaluated. The evaluation criteria were as described below.
A: Stains are not visually observed.
B: Very small stains are visually observed during careful observation.
C: Stains are clearly observed in visual observation.

Example 1

A decorative sheet 10 containing a first olefin resin layer 3, a second olefin resin layer 2, and a surface-protecting layer 1 that were laminated in this order was prepared.

First, the first olefin resin layer 3 formed of a 80-μm-thick polyethylene sheet and the second olefin resin layer 2 prepared in accordance with the following production method were laminated through an adhesive layer.

Secondly, a surface-protecting-layer-coating solution A of the following formulation was applied on the second olefin resin layer 2 by roll coating such that the thickness after drying was 15 μm.

Subsequently, the applied coating was irradiated with electron beams in an atmosphere with an oxygen concentration of 200 ppm or less at an accelerating voltage of 175 keV and at a dose of 5 Mrad with an electron beam irradiator and cured, thereby preparing a surface-protecting layer 1.

Additionally, embossing was performed from the surface-protecting layer 1 side by thermal pressure to form the projection-depression pattern of a wood-grain vessel pattern, thereby preparing a decorative sheet of Example 1.

Method for Producing Second Olefin Resin Layer 2

1000 ppm of sodium 2,2'-methylenebis(4,6-di-tert-butylphenyl)phosphonate (nucleating agent) was added to a high-crystallinity homo-polypropylene resin with an isotactic pentad fraction of 97.8%, an MFR of 15 g/10 min (230° C.), and a molecular weight distribution (Mw/Mn) of 2.3; and this mixture was extruded with a melt-extruder, thereby forming a 80-μm-thick polypropylene sheet formed of microcrystalline homo-polypropylene.

Surface-Protecting-Layer-Coating Solution A

Difunctional urethane acrylate oligomer: 80 parts by mass (polyol component: polyester diol, glass-transition temperature: 25° C., molecular weight: 1500)

Hexafunctional aliphatic urethane acrylate oligomer: 20 parts by mass (glass-transition temperature: 200° C. or higher, molecular weight: 1500, UA306H, Kyoeisha Chemical Co., Ltd.)

Inorganic microparticles: 14 parts by mass (silica microparticles with a mean particle size of 10 μm)

Example 2

The procedure of Example 1 was repeated, except that the amount of the hexafunctional aliphatic urethane acrylate oligomer of the surface-protecting-layer-coating solution A was changed to 100 parts by mass; and that the difunctional urethane acrylate oligomer was not added, thereby preparing a decorative sheet of Example 2.

Example 3

The procedure of Example 1 was repeated, except that the amount of the difunctional urethane acrylate oligomer of the surface-protecting-layer-coating solution A was changed to 20 parts by mass, and that the amount of the hexafunctional aliphatic urethane acrylate oligomer of the surface-protecting-layer-coating solution A was changed to 80 parts by mass, thereby preparing a decorative sheet of Example 3.

Example 4

The procedure of Example 1 was repeated, except that the amount of the nucleating agent was changed to 2000 ppm for the second olefin resin layer 2 of Example 1, thereby preparing a decorative sheet of Example 4.

Example 5

The procedure of Example 1 was repeated, except that the amount of the difunctional urethane acrylate oligomer of the surface-protecting-layer-coating solution A was changed to 20 parts by mass, that the amount of the hexafunctional aliphatic urethane acrylate oligomer of the surface-protecting-layer-coating solution A was changed to 80 parts by mass, and that the amount of the nucleating agent was changed to 2000 ppm, thereby preparing a decorative sheet of Example 5.

Comparative Example 1

The procedure of Example 1 was repeated, except that a polypropylene sheet for use for the second olefin resin layer 2 of Example 1 was prepared by extrusion with a melt-extruder without adding 1000 ppm of sodium 2,2'-methylenebis(4,6-di-tert-butylphenyl)phosphonate (nucleating agent), thereby preparing a decorative sheet of Comparative Example 1.

Comparative Example 2

The procedure of Example 3 was repeated, except that a polypropylene sheet for use for the second olefin resin layer 2 of Example 1 was prepared by extrusion with a melt-extruder without adding 1000 ppm of sodium 2,2'-methylenebis(4,6-di-tert-butylphenyl)phosphonate (nucleating agent), thereby preparing a decorative sheet of Comparative Example 2.

TABLE 1

| | Indentation Hardness | | | Scratch Resistance | Bending Workability | Du Pont Impact | Stain Resistance After Du Pont Impact |
|---|---|---|---|---|---|---|---|
| | $H_{IT}^1$ | $H_{IT}^2$ | $H_{IT}^3$ | | | | |
| Example 1 | 180 | 110 | 45 | B | A | A | A |
| Example 2 | 400 | 110 | 45 | A | B | A | A |
| Example 3 | 330 | 110 | 45 | A | B | A | A |
| Example 4 | 180 | 140 | 45 | B | A | B | C |
| Example 5 | 330 | 140 | 45 | A | B | B | C |
| Comparative Example 1 | 180 | 90 | 45 | C | A | A | A |
| Comparative Example 2 | 330 | 90 | 45 | C | B | A | A |

(In Table 1, the unit of indentation hardness is MPa. $H_{IT}^1$, $H_{IT}^2$, and $H_{IT}^3$ respectively represent the indentation hardness of the surface-protecting layer, the second olefin resin layer, and the first olefin resin layer.)

From the results of Table 1, the decorative sheets of Examples 1 to 5 are confirmed to have excellent scratch resistance under high-load conditions, and excellent bending workability. A comparison between the decorative sheets of Examples 1 to 3 and the decorative sheets of Examples 4 and 5 indicates that setting indentation hardness $H_{IT}^2$ of the second olefin resin layer 2 at 100 MPa or more and less than 140 MPa (preferably 130 MPa or less) results in not only excellent scratch resistance and bending workability, but also excellent Du Pont impact resistance and stain resistance after applying Du Pont impact.

INDUSTRIAL APPLICABILITY

The decorative sheet according to the present invention exhibits excellent scratch resistance under high-load conditions, and excellent bending workability; and is usable as a surface material for building materials, in particular as a decorative material for floors.

DESCRIPTION OF THE REFERENCE NUMERALS 1. surface-protecting layer
2. second olefin resin layer
3. first olefin resin layer
4. depressions (embossed depressions)
10. decorative sheet
11. decorative plate base
12. decorative plate
20. measurement sample
21. Berkovich indenter
22. the direction in which load is applied

The invention claimed is:

1. A decorative sheet comprising, in sequence, a first olefin resin layer, a second olefin resin layer, and a surface-protecting layer, the decorative sheet having depressions formed from the outermost face of the surface-protecting layer, wherein the first olefin resin layer is a polyethylene sheet,
wherein the second olefin resin layer is a homo-polypropylene sheet,
wherein the surface-protecting layer comprises a difunctional urethane acrylate oligomer and a hexafunctional aliphatic urethane acrylate oligomer,
wherein the second olefin resin layer comprises a crystal nucleating agent, and the content of the crystal nucleating agent in the second olefin resin layer is 0.01 to 0.1 parts by mass, per 100 parts by mass of the resin component that forms the second olefin resin layer,
wherein the first olefin resin layer has a thickness of 55 to 85 µm, the second olefin resin layer has a thickness of 55 to 85 µm, and the surface-protecting layer has a thickness of 3 to 45 µm, and
wherein indentation hardness $H_{IT}^2$ of the second olefin resin layer and indentation hardness $H_{IT}^1$ of the surface-protecting layer satisfy the following formulas (1) and (2):

$$140 \text{ MPa} > H_{IT}^2 \geq 100 \text{ MPa} \tag{1}$$

and $$H_{IT}^1 > H_{IT}^2 \tag{2},$$

wherein the indentation hardness $H_{IT}^1$ of the surface-protecting layer satisfies the following formula (3):

$$450 \text{ MPa} > H_{IT}^1 \tag{3},$$

and
wherein the indentation hardness $H_{IT}^2$ of the second olefin resin layer and indentation hardness $H_{IT}^3$ of the first olefin resin layer satisfy the following formula (4):

$$H_{IT}^2 > H_{IT}^3 \tag{4}.$$

2. The decorative sheet according to claim 1, wherein the second olefin resin layer is a microcrystalline olefin resin layer.

3. The decorative sheet according to claim 2, wherein the surface-protecting layer comprises inorganic microparticles with a mean particle size of 20 µm or less.

4. The decorative sheet according to claim 1, wherein the surface-protecting layer comprises inorganic microparticles with a mean particle size of 20 µm or less.

5. A decorative plate comprising a laminate, the laminate comprising, in sequence in the thickness direction,
a decorative plate base, and
the decorative sheet according to claim 1.

6. A decorative plate comprising a laminate, the laminate comprising, in sequence in the thickness direction,
a decorative plate base, and
the decorative sheet according to claim 2.

* * * * *